March 2, 1943.  J. P. BULL  2,312,521
VASE AND FLOWER LIFTER
Filed April 18, 1942

INVENTOR.
JAMES P. BULL
BY A. B. Bowman
Attorney

UNITED STATES PATENT OFFICE 2,312,521

VASE AND FLOWER LIFTER

James P. Bull, San Diego, Calif.

Application April 18, 1942, Serial No. 439,473

5 Claims. (Cl. 294—19)

My invention relates to a vase and flower lifter, more particularly for placing, arranging, removing and renewing flowers in vases in crypts or other places in mausoleums or the like, and the objects of my invention are:

First, to provide a device for lifting a vase with water and flowers therein for placing it back into crypts or deep recesses without spilling the water or flowers;

Second, to provide a device of this class which is so constructed that the vase is not tilted in handling the same in out of the way places;

Third, to provide a device of this class in which the parts are pivotally mounted so that the weight of the vase tends to hold the device in position for holding the vase upright at all times when handling the same;

Fourth, to provide a device of this class in which the several parts are all pivotally connected together for providing automatic vertical relationship of the vase with flowers and water;

Fifth, to provide a device of this class which is applicable for use in connection with various types of vases;

Sixth, to provide a device of this class which is very simple and economical of construction, easy to operate, efficient in its action and which will not readily deteriorate or get out of order.

Figure 1:
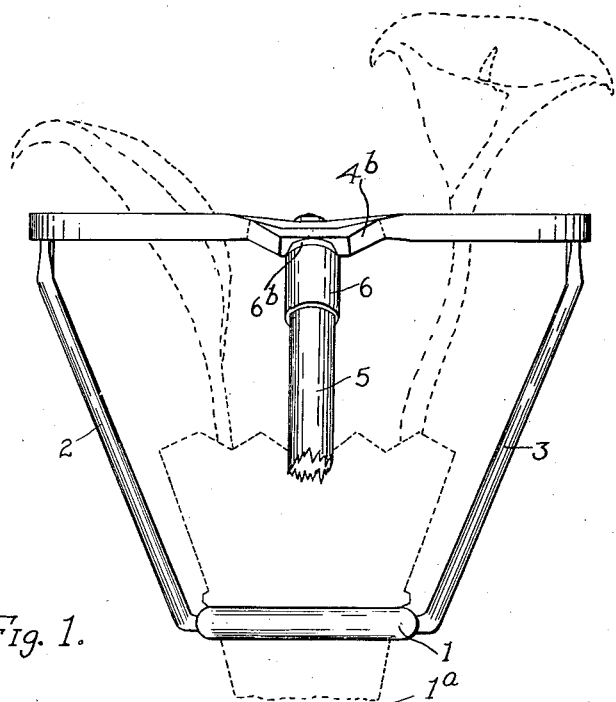
Figure 2:
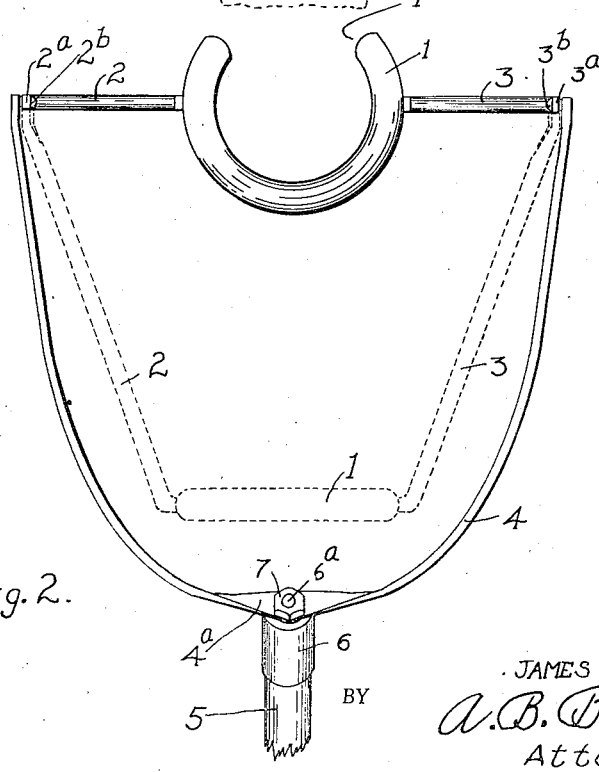

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a rear elevational view of my vase and flower lifter showing the handle fragmentarily and showing by dash lines the vase with flowers in operative relation therewith; Fig. 2 is a top or plan view of the device with the handle shown fragmentarily and showing by dash lines shifted collapsed positions of the vase holder and supporting arms.

Similar characters of reference refer to similar parts and portions throughout the views of the drawing:

The vase support 1, vase support arms 2 and 3, main supporting bracket 4, handle member 5, handle member ferrule 6, and ferrule nut 7 constitute the principal parts and portions of my vase and flower lifter.

The vase support 1 is an arcuate little more than semi-circular member, preferably made of one-half inch round metal and arranged to fit around a vase near its upper end, as shown best in Fig. 1 of the drawing. At the front side of the device the vase holder 1 is open at 1a a sufficient distance to permit the holder to be placed over the vase a considerable distance from the upper side and then the member 1 is drawn upwardly until it snugly engages the vase near its upper end. The holder 1 is provided at opposite sides substantially at the middle with outwardly and upwardly extending arms 2 and 3 which are preferably made of quarter inch round metal. At the upper ends at 2a and 3a, these members are flattened, as shown in the drawing, and pivotally connected to their outer sides by means of rivets 2b and 3b is the main supporting bracket 4. This main supporting bracket 4 is substantially U-shaped, as shown best in Fig. 2 of the drawing, and is preferably made of flat strap metal three-eighths by one-eighths inches and is of sufficient size to permit the shifting of the members 1, 2 and 3 into the position as shown by dash lines relatively thereto in Fig. 2 of the drawing. The member 4 is provided with a substantially quarter-twisted portion 4a intermediate its ends which is provided with a reinforcing portion 4b on one flat side and through the reinforcing portions and the portion 3a is a hole which is adapted to receive the extended end of a screw-threaded lug 6a which is positioned centrally on one end of a ferrule 6 and mounted on the threaded end of the lug 6a is a nut 7 which screws down to the bottom of the threads tightly on the lug 6a but leaving plenty of clearance for the member 4 to revolve on the lug portion between the nut 7 and the ends of the ferrule 6. which ferrule 6 is tapered at 6b, as shown best in Fig. 1 of the drawing. The ferrule 6 is hollow and secured therein is the one end of the handle 5. The hand 5 may be any length desired. It is preferably four or five feet long and fits tightly in the ferrule 6.

The operation of my vase and flower lifter is substantially as follows: To place a vase with the flowers and water in a crypt or the like, the vase with the water and flowers is placed in the holder 1 and permitted to lower until engaged by the holder 1. Then the operator taking hold of the handle 5 extends the device with the vase and water and flowers to the position desired and lowers the same onto a floor or bracket, then permits the holder to lower to a position on the vase so that the opening 1a will pass around the lower end of the vase, and by withdrawing the handle and the device, the holder will be removed from the vase and the vase left standing in position, it being noted that the bracket 4 is pivotally mounted relatively to the handle and ferrule 6 and that the arms 2 and 3 are pivotally mounted relatively to the extended ends of the members of the bracket 4 so that the weight of the vase of water tends to hold the same in vertical position at all times. In removing the vase with the water and flowers, the handle is grasped by the operator and the device extended to a position so that the vase holder is near the lower or base portion of the vase and then moved forwardly so that the member 1 extends around the lower end of the vase, then by raising the device by operating the handle, the vase is engaged near its upper side and can be lifted and removed, the vase always standing in vertical position by reason of the pivotal mounting of the parts of the device.

Though I have shown and described a particular construction, combination and arrangement of parts and portions, I do not wish to be limited to this particular construction, combination and arrangement, nor to the material used, but desire to include in the scope of my invention the construction, combination and arrangement substantially as set forth in the appended claims.

Having thus described my invention, what I claim as new and desire to secure by Letters Patent is:

1. In a vase and flower lifter of the class described, the combination of an arcuate vase holder provided with an open space at one side thereof, outwardly and upwardly extending arms secured centrally to the side walls of said holder and a U-shaped bracket pivotally connected to the extended ends of said arms.

2. In a vase and flower lifter of the class described, the combination of an arcuate vase holder provided with an open space at one side thereof, outwardly and upwardly extending arms secured centrally to the side walls of said holder and a U-shaped bracket pivotally connected to the extended ends of said arms, said U-shaped member and said arms being shaped and arranged so that said arms and the vase holder will nest in said U-shaped frame member.

3. In a flower and vase lifter of the class described, the combination of an arcuate vase holder provided with an open space at one side thereof, outwardly and upwardly extending arms secured centrally to the side walls of said holder, a U-shaped bracket pivotally connected to the extended ends of said arms, said U-shaped member and said arms being shaped and arranged so that said arms and the vase holder will nest in said U-shaped frame member, and a handle member pivotally connected with said U-shaped main frame member intermediate its ends.

4. In a vase and flower lifter of the class described, a pivotally suspended vase support and a pivotally mounted U-shaped main frame with its extended ends forming the pivotal support for said suspended vase support.

5. In a vase and flower lifter of the class described, a pivotally suspended vase support and a pivotally mounted U-shaped main frame with its extended ends forming the pivotal support for said suspended vase support and an extended handle for said main U-shaped frame.

JAMES P. BULL.